(12) United States Patent
Zheng (10) Patent No.: US 8,488,966 B2
(45) Date of Patent: Jul. 16, 2013

(54) DATA TRANSMISSION METHOD OF OPTICAL ACCESS NETWORK, AND SYSTEM AND DEVICE THEREOF

(75) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 309 days.

(21) Appl. No.: 12/793,771

(22) Filed: Jun. 4, 2010

(65) Prior Publication Data
US 2010/0239256 A1 Sep. 23, 2010

Related U.S. Application Data

(63) Continuation of application No. PCT/CN2008/073294, filed on Dec. 2, 2008.

(30) Foreign Application Priority Data

Dec. 5, 2007 (CN) .......................... 2007 1 0032132

(51) Int. Cl.
*H04J 14/00* (2006.01)

(52) U.S. Cl.
USPC ............ 398/72; 398/66; 398/67; 398/68; 398/70; 398/71; 398/100; 398/115; 455/561; 455/562; 455/422.1; 455/426.1; 370/352; 370/468; 370/338; 370/539; 370/401; 725/125; 725/127; 725/129; 725/121

(58) Field of Classification Search
USPC ............... 398/66, 67, 68, 69, 70, 71, 72, 74, 398/75, 76, 79, 98, 99, 100, 115, 135, 136, 398/137, 138, 139, 164, 158, 159, 116, 117, 398/58, 59; 455/561, 562, 422, 3.1, 5.1, 6.1, 455/6.3, 426.1, 422.1, 403; 370/352, 392, 370/389, 468, 432, 465, 539, 338, 401; 725/105, 725/106, 125, 127, 129, 121
See application file for complete search history.

(56) References Cited

U.S. PATENT DOCUMENTS

| | | | |
|---|---|---|---|
| 6,895,185 B1 * | 5/2005 | Chung et al. ................... | 398/72 |
| 8,098,990 B2 * | 1/2012 | Hu et al. .......................... | 398/72 |

(Continued)

FOREIGN PATENT DOCUMENTS

| | | |
|---|---|---|
| CN | 1360402 A | 7/2002 |
| CN | 1801673 A | 7/2006 |

(Continued)

OTHER PUBLICATIONS

First Office Action of corresponding Chinese Patent Application No. 200710032132.2, mailed on Jun. 2, 2011, 18 pages total.

(Continued)

*Primary Examiner* — Hanh Phan
(74) *Attorney, Agent, or Firm* — Brinks Hofer Gilson & Lione (57) ABSTRACT

An optical access network (OAN) system is provided. In the system, a remote radio unit (RRU) receives and sends a wireless signal and implement conversion between the wireless signal and a first frequency signal; an optical network device receives and sends the wireless signal, and implement conversion between the wireless signal and the first frequency signal and conversion between the first frequency signal and a fiber transmission signal; an optical distribution network (ODN) connected to the optical network device transmits the fiber transmission signal; an optical line terminal (OLT) device receives and sends the fiber transmission signal, and implements conversion between the fiber transmission signal and a second frequency signal, conversion between the second frequency signal and a base band signal, and conversion between the base band signal and a signal of another standard protocol.

10 Claims, 9 Drawing Sheets

U.S. PATENT DOCUMENTS

| | | | |
|---|---|---|---|
| 2003/0072055 A1 | 4/2003 | Mickelsson et al. | |
| 2004/0264683 A1* | 12/2004 | Bye | 379/402 |
| 2005/0025505 A1* | 2/2005 | Soto et al. | 398/214 |
| 2005/0031347 A1* | 2/2005 | Soto et al. | 398/58 |
| 2006/0045525 A1* | 3/2006 | Lee et al. | 398/71 |
| 2006/0182446 A1* | 8/2006 | Kim et al. | 398/72 |
| 2007/0025735 A1 | 2/2007 | Sakamoto et al. | |

FOREIGN PATENT DOCUMENTS

| | | |
|---|---|---|
| CN | 1988724 A | 6/2007 |
| CN | 200973095 Y | 11/2007 |
| JP | 2004312150 A | 11/2004 |
| JP | 2006094446 A | 4/2006 |
| JP | 200736920 | 2/2007 |
| JP | 2007166278 A | 6/2007 |
| WO | 2004054290 A1 | 6/2004 |

OTHER PUBLICATIONS

Search report of corresponding European Patent Application No. 08862723.7, mailed on May 3, 2011, 8 pages total.

First Office Action of corresponding Japanese Patent Application No. 2010533422, mailed on Nov. 29, 2011, 6 pages total.

Written opinion of corresponding PCT Patent Application No. PCT/CN2008/073294, mailed on Mar. 12, 2009, 4 pages total.

First Office Action of corresponding Japanese Patent Application No. 2010533422, mailed on May 15, 2012, and English translation thereof, 4 pages total.

* cited by examiner

DATA TRANSMISSION METHOD OF OPTICAL ACCESS NETWORK, AND SYSTEM AND DEVICE THEREOF

CROSS-REFERENCE TO RELATED APPLICATIONS

The application is a continuation of International Application No. PCT/CN/2008/073294, filed on Dec. 2, 2008, which claims priority to Chinese Patent Application No. 200710032132.2, filed on Dec. 5, 2007, both of which are hereby incorporated by reference in their entireties.

FIELD OF THE TECHNOLOGY

The present invention relates to the field of optical transmission and the field of mobile communication, and particularly to a data transmission method of an optical access network (OAN), and a system and a device thereof.

BACKGROUND OF THE INVENTION

In wireless communications, with the rapid increase of the density of wireless users, the capacity of a wireless cellular system is required to be greater and greater. In order to effectively increase the capacity of a wireless cellular system, the most effective method is to reduce a cell radius, that is, to develop from a macro cell towards a micro cell. In order to adapt to the construction of base station by using this method, a base station is usually split into a remote radio unit (RRU) and a base band unit (BBU). The cost of such a distributed base station is only a part of the cost of a complete base station, although there are the largest number of the RRUs thereof. Thus, the design of a distributed base station can effectively reduce the cost of base station construction.

Figure 1:
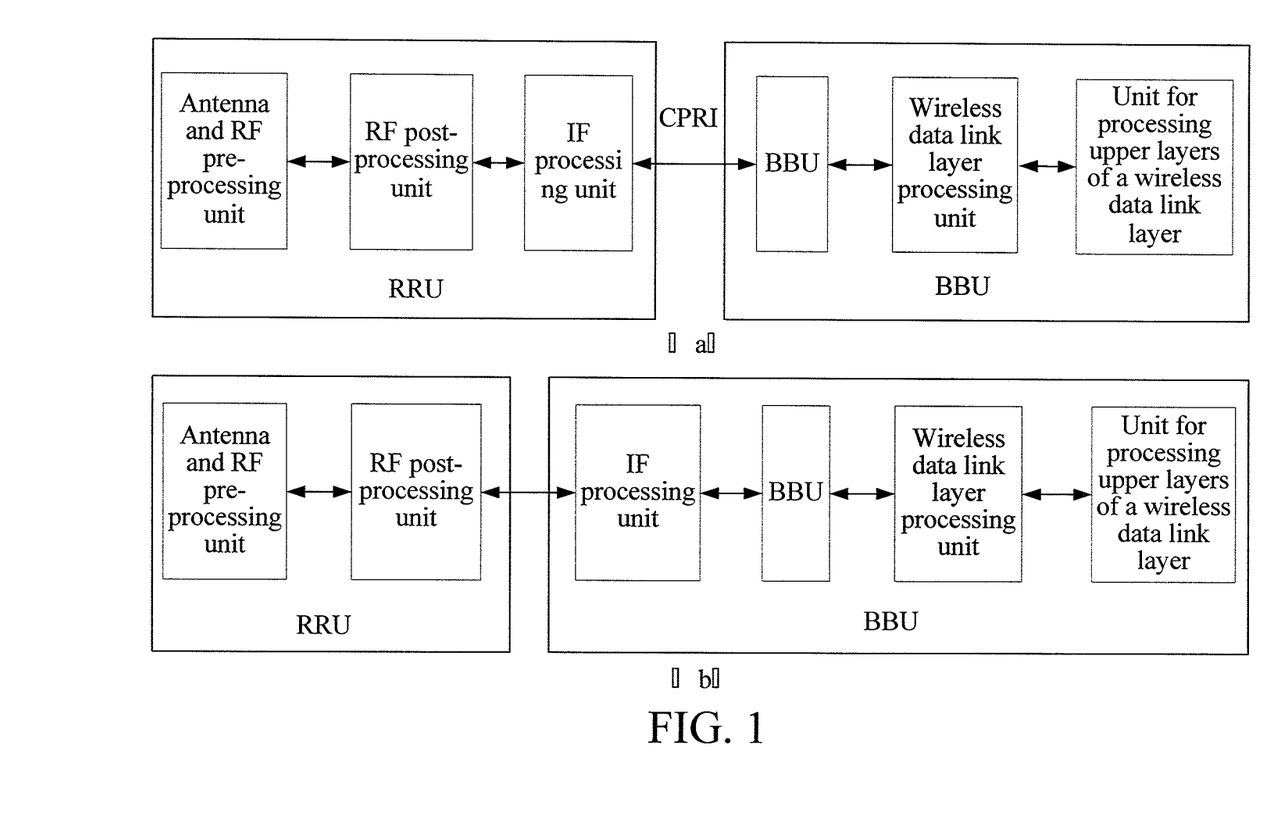
FIG. 1 is a schematic structural view of each part of an existing distributed base station.

A complete base station may include a unit for processing upper layers of a wireless data link layer (optional), a wireless data link layer processing unit (optional), a BBU, an intermediate frequency (IF) processing unit, a radio frequency (RF) post-processing unit, and an antenna and RF pre-processing unit. After the base station is split into two parts of RRU and BBU, the functions of each part are as shown in FIG. 1. The RRU includes an antenna and RF pre-processing unit, an RF post-processing unit, and/or an IF processing unit. Correspondingly, the BBU at least includes a BBU and may further include an IF processing unit, a wireless data link layer processing unit (optional), and a unit for processing upper layers of a wireless data link layer (optional). If the RRU includes an IF processing unit, as shown in (a) in FIG. 1, interacting between the RRU and the BBU may be performed by using an IF digital signal in time division multiplexing (TDM) mode. For example, interacting between the RRU and the BBU is performed by using a Common Public Radio Interface (CPRI). If the BBU includes the IF processing unit, as shown in (b) in FIG. 1, interacting between the RRU and the BBU may be performed by using an RF digital signal in TDM mode.

A distributed base station can effectively reduce the network construction cost of the cellular system. However, the design has the following problem: Currently, RRU and BBU devices produced by different manufacturers cannot match each other and the privatization of interfaces is serious.

SUMMARY OF THE INVENTION

The present invention is directed to an OAN system, a corresponding optical line terminal (OLT) device, a corresponding optical network device, and a passive optical network (PON) data transmission method, and provides uniform and matchable interfaces for a BBU and an RRU in a distributed base station.

In one aspect, in an embodiment, the present invention provides an OAN system, which includes an RRU, an optical network device, an optical distribution network (ODN), and an OLT device. The RRU is configured to receive a wireless signal, convert the wireless signal into a first frequency signal, and send the first frequency signal to the optical network device; the optical network device is configured to receive the first frequency signal from the RRU, convert the first frequency signal into a fiber transmission signal, and send the fiber transmission signal to the ODN; the ODN is configured to receive the fiber transmission signal from the optical network device, and transmit the fiber transmission signal to the OLT device; and the OLT device is configured to receive the fiber transmission signal transmitted by the ODN, and convert the fiber transmission signal into a signal of another standard protocol. Alternatively, the OLT device is configured to convert a signal of another standard protocol into a fiber transmission signal, and send the fiber transmission signal to the ODN; the ODN is configured to send the fiber transmission signal to the optical network device; the optical network device is configured to receive the fiber transmission signal transmitted by the ODN, convert the fiber transmission signal into a first frequency signal, and send the first frequency signal to the RRU; and the RRU is configured to convert the first frequency signal into a wireless signal, and send the wireless signal.

In an embodiment, the present invention further provides an optical network device, which includes a first rate adaptation unit and a first data processing unit. The first rate adaptation unit is configured to receive a first frequency signal, perform rate adaptation and frame format conversion on the frequency signal to obtain a first adaptation signal, and send the first adaptation signal to the first data processing unit; and the first data processing unit is configured to receive the first adaptation signal from the first rate adaptation unit, and convert the first adaptation signal into a fiber transmission signal according to an optical transmission protocol. Alternatively, the first data processing unit is configured to convert a fiber transmission signal into a first adaptation signal according to an optical transmission protocol, and send the first adaptation signal to the first rate adaptation unit; and the first rate adaptation unit is configured to receive the first adaptation signal sent by the first data processing unit, perform rate adaptation and frame format conversion on the first adaptation signal to obtain a first frequency signal, and send the first frequency signal. Meanwhile, in an embodiment, the present invention further provides an OLT device, which includes a second data processing unit, a second rate adaptation unit, a BBU, and an interface unit. The second data processing unit is configured to receive a fiber transmission signal from an ODN, convert the fiber transmission signal into a second adaptation signal according to an optical transmission protocol, and send the second adaptation signal to the second rate adaptation unit; the second rate adaptation unit is configured to receive the second adaptation signal from the second data processing unit, perform rate adaptation and frame format conversion on the second adaptation signal to obtain a second frequency signal, and send the second frequency signal to the BBU; the BBU is configured to receive the second frequency signal sent by the second rate adaptation unit, convert the second frequency signal into a base band signal, and send the base band signal to the interface unit; and the interface unit is configured to receive the base band signal sent by the BBU, and convert the base band signal into a signal of another standard protocol. Alternatively, the interface unit is configured to receive a signal of another standard protocol, convert the signal of another standard protocol into a base band signal, and send the base band signal to the BBU; the BBU is configured to receive the base band signal sent by the interface unit, convert the base band signal into a second frequency signal, and send the second frequency signal to the second rate adaptation unit; the second rate adaptation unit is configured to receive the second frequency signal sent by the BBU, perform rate adaptation and frame format conversion on the second frequency signal to obtain a second adaptation signal, and send the second adaptation signal to the second data processing unit; and the second data processing unit is configured to receive the second adaptation signal sent by the second rate adaptation unit, convert the second adaptation signal into a fiber transmission signal according to an optical transmission protocol, and send the fiber transmission signal to an ODN for transmission.

In another aspect, in an embodiment, the present invention provides a data transmission method of an OAN, which includes: receiving wireless service data of a wireless user, and performing frequency processing on the wireless service data to obtain a first frequency signal; performing rate adaptation and frame format conversion on the first frequency signal to obtain a first adaptation signal; converting the first adaptation signal into a fiber transmission signal according to an optical transmission protocol, and transmitting the fiber transmission signal over an ODN; and converting the fiber transmission signal transmitted over the ODN into a signal of another standard protocol according to the optical transmission protocol for transmission to another network.

In an embodiment, the present invention further provides another data transmission method of an OAN, which includes: receiving a signal from another network, converting the signal into a fiber transmission signal, and transmitting the fiber transmission signal over an ODN; converting the fiber transmission signal transmitted through the ODN into a first adaptation signal according to an optical transmission protocol; performing rate adaptation and frame format conversion on the first adaptation signal to obtain a first frequency signal; and converting the first frequency signal to obtain wireless service data, and sending the wireless service data to a wireless user.

In the present invention, a distributed base station is combined with a passive optical network (PON). Since the existing PON (for example, a gigabit passive optical network (GPON) and an Ethernet passive optical network (EPON)) has established uniform standards, devices provided by manufacturers can match each other, so that the problem of unmatchable interfaces between an RRU and a BBU is solved. The large-scale application of the PON in the distributed base station may promote the rapid industrialization of the distributed base station, and effectively reduce the network construction cost of a cellular system.

DETAILED DESCRIPTION OF THE EMBODIMENTS

Exemplary embodiments of the present invention are described below with reference to the accompanying drawings. In the accompanying drawings, the same reference numerals are used to indicate the same elements in different figures.

The objective of the specific embodiments of the present invention is to provide uniform standard interfaces for an RRU and a BBU in a distributed base station. In addition, in a PON in an OAN, a point-to-multipoint connection between the RRU and the BBU in the distributed base station may also be used between a user access end and an optical path termination point. Meanwhile, in the OAN, devices between the user access end and the optical patch termination point produced by different manufacturers can match each other. Therefore, the distributed base station may be combined with an OAN system to realize the objective of the specific embodiments of the present invention.

Figure 2:
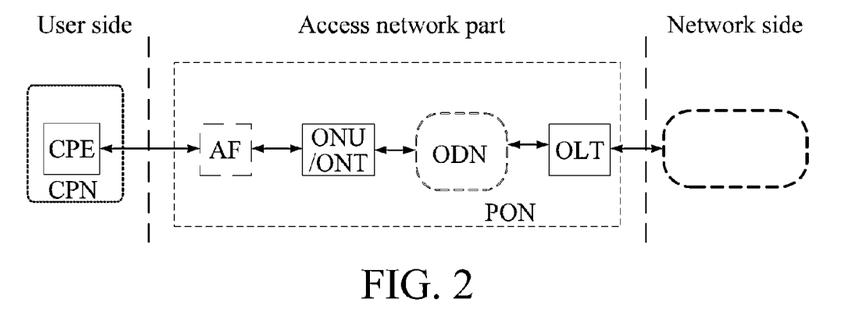
FIG. 2 is a schematic view of a reference architecture of an existing PON.

The existing OAN mainly includes an active optical network (AON) and a PON. The reference architecture of the PON is shown in FIG. 2. The architecture of the AON is similar to the architecture of the PON, and only the architecture of the PON is described below. The entire network is formed by a customer premises network (CPN), a PON, and a service node function (SNF). The PON mainly includes an OLT device installed at a central control station, a batch of ONUs or ONTs installed at a user site, and an ODN between the OLT device and the ONUs/ONTs including fiber and passive optical splitters or couplers.

Figure 3:
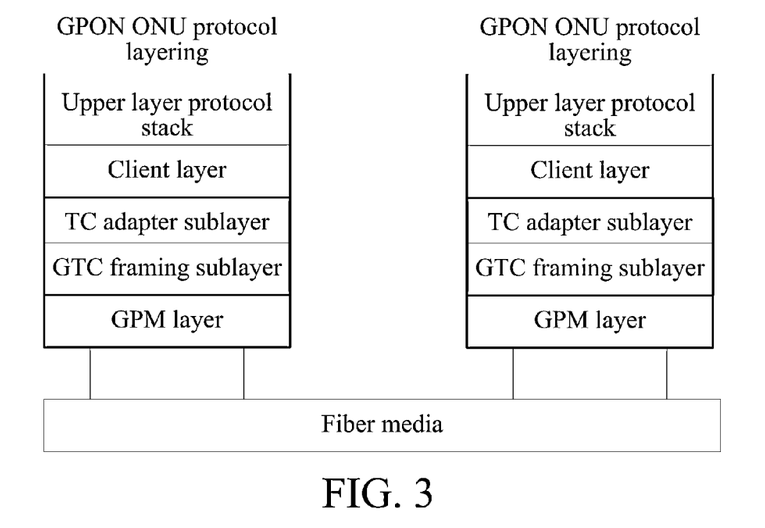
FIG. 3 is a schematic view of an existing GPON system protocol stack.
Figure 4:
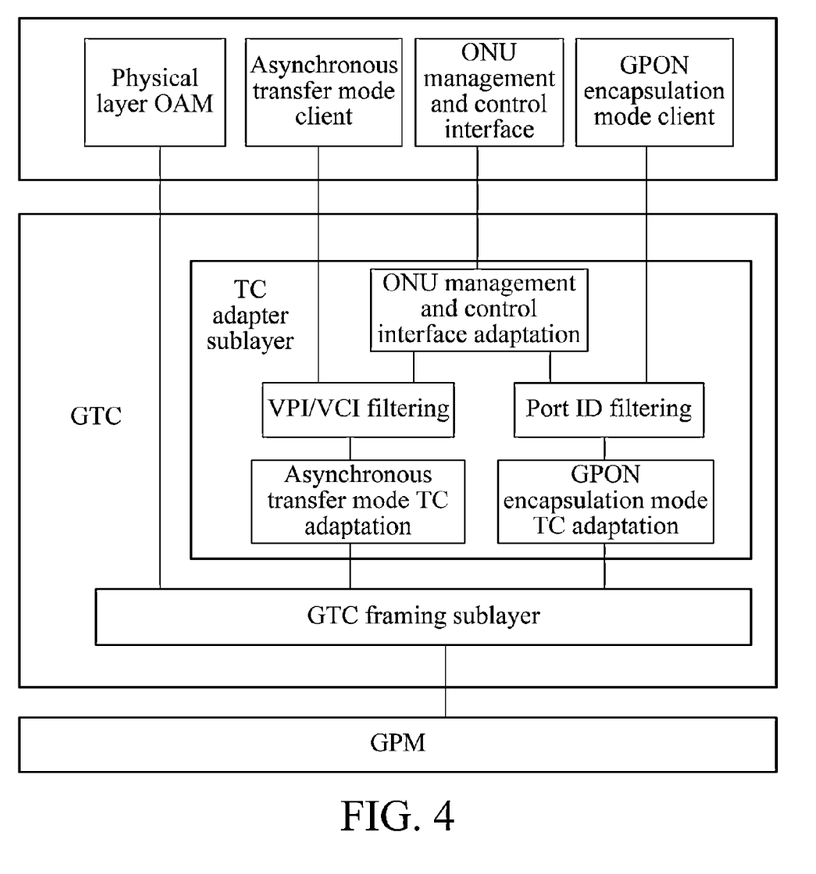
FIG. 4 is a schematic functional view of a Gigabit PON transmission convergence (GTC) layer shown in FIG. 3.
Figure 5:
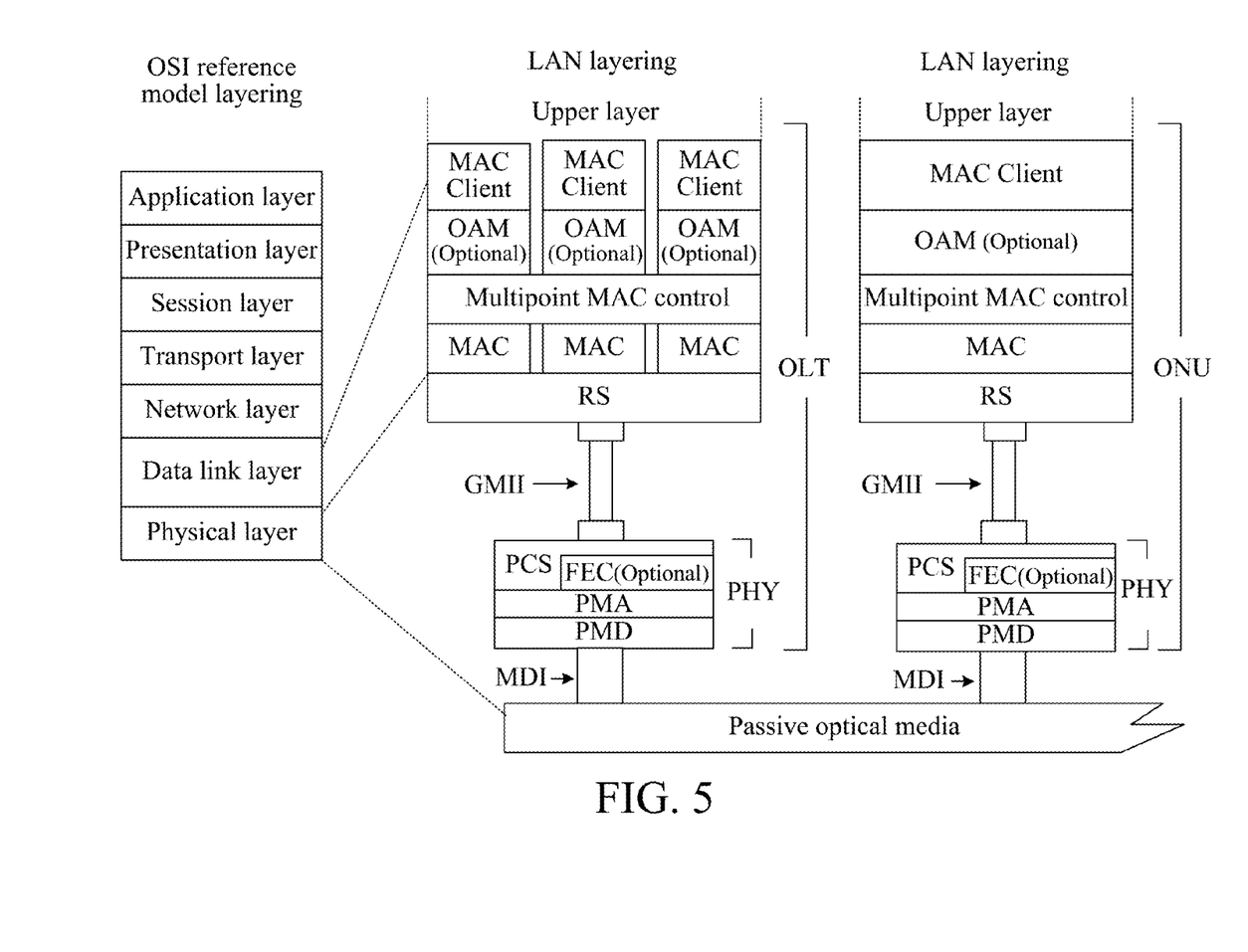
FIG. 5 is a schematic view illustrating the relationship between an existing EPON system protocol stack and an Open Systems Interconnection (OSI) reference model.

Currently, the PON mainly includes a GPON and an EPON. A GPON system protocol stack is shown in FIG. 3, and includes a GPON physical media dependent layer (GPM) and a GTC. The GPM is responsible for transmission of a GTC frame on a fiber, and corresponds to an optical transmission interface (also referred to as a PON interface) between the OLT device and the ONU. The GTC includes two sublayers: a TC adapter sublayer and a GTC framing sublayer, and a protocol structure thereof is shown in FIG. 4. FIG. 5 is a schematic view illustrating the relationship between an EPON system protocol stack and an OSI reference model. An EPON protocol layer includes a data link layer and a physical layer. A reconciliation sublayer (RS) is configured to enable a variety of data link layers to use uniform PON physical layer interfaces.

Figure 6:
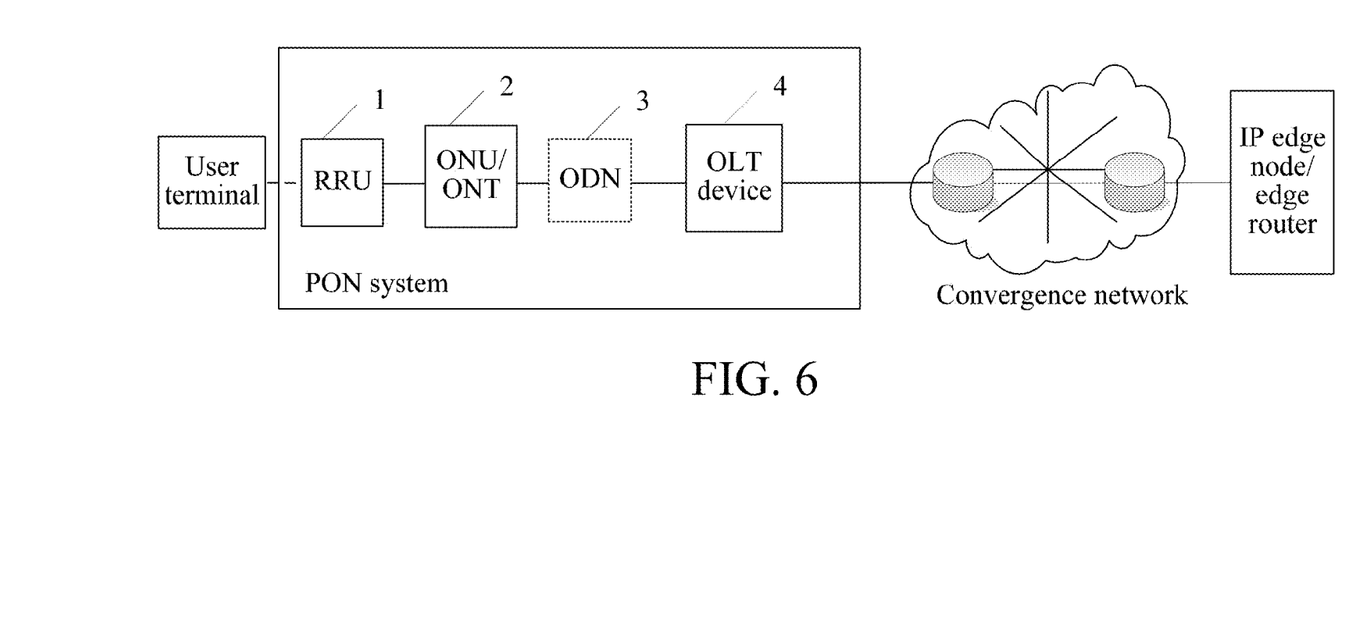
FIG. 6 is a schematic view of a first specific embodiment of an OAN system in the present invention.

Based on the above existing access network system, the present invention provides an OAN system combined with the distributed base station in the specific embodiments. FIG. 6 is a schematic view of a first specific embodiment of an OAN system in the present invention. As shown FIG. 6, in the first specific embodiment of the present invention, the OAN system includes an RRU 1, an ONU/ONT 2, an ODN 3, and an OLT device 4. When a signal is transmitted from a user side to a network side, as shown in FIG. 2, the RRU 1 is configured to receive a wireless signal sent by a user (for example, a device such as a mobile terminal), perform IF/RF processing on the wireless signal to convert it into a first IF/RF signal, and send the first IF/RF signal to the ONU/ONT 2; then, the ONU/ONT 2 converts the first IF/RF signal into a fiber transmission signal, and transmits the fiber transmission signal to the OLT device 4 over the ODN 3; and the OLT device 4 receives the fiber transmission signal and converts it into a signal of another standard protocol. The signal of another standard protocol may be a signal that can be transmitted over various convergence networks.

When a signal is transmitted from the network side to the user side, the OLT device 4 is configured to convert a signal of another standard protocol into a fiber transmission signal, and transmit the fiber transmission signal to the ONU/ONT 2 over the ODN 3; then, the ONU/ONT 2 converts the fiber transmission signal into a first IF/RF signal, and sends the first IF/RF signal to the RRU 1; and next, the RRU 1 converts the first IF/RF signal into a wireless signal and sends the wireless signal. The above OAN system may specifically be a GPON or EPON, and may also be an AON. When the OAN system is an AON, the ONU/ONT, the ODN, and the OLT device are the corresponding devices in the AON.

The technical solution of an OAN system in the embodiment of the present invention is elaborated specifically above. An optical network device and an OLT in an embodiment of the present invention are illustrated specifically in the following.

Figure 7:
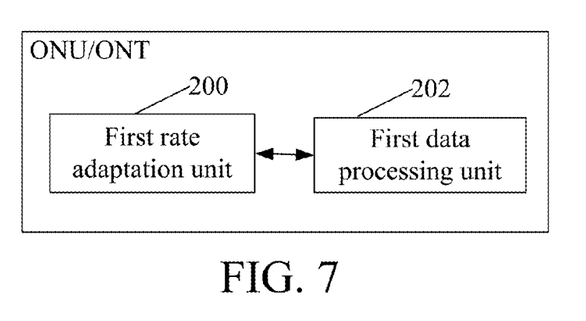
FIG. 7 is a schematic structural view of a specific embodiment of an ONU/ONT shown in FIG. 6.

In the embodiment of the present invention, the optical network device may be the ONU/ONT. As shown in FIG. 7, the ONU/ONT may specifically include a first rate adaptation unit 200 and a first data processing unit 202. When a signal is transmitted from the user side to the network side, the first rate adaptation unit 200 is configured to receive a first IF/RF signal from the RRU 1, perform rate adaptation and frame format conversion on the IF/RF signal to obtain a first adaptation signal, and send the first adaptation signal to the first data processing unit 202; then, the first data processing unit 202 converts the received first adaptation signal into a fiber transmission signal according to an optical transmission protocol. When a signal is transmitted from the network side to the user side, the first data processing unit 202 is configured to convert a fiber transmission signal into the first adaptation signal according to an optical transmission protocol, and send the first adaptation signal to the first rate adaptation unit 200; and then, the first rate adaptation unit 200 performs rate adaptation and frame format conversion on the received first adaptation signal to obtain a first IF/RF signal, and sends the first IF/RF signal to the RRU 1.

Figure 8:
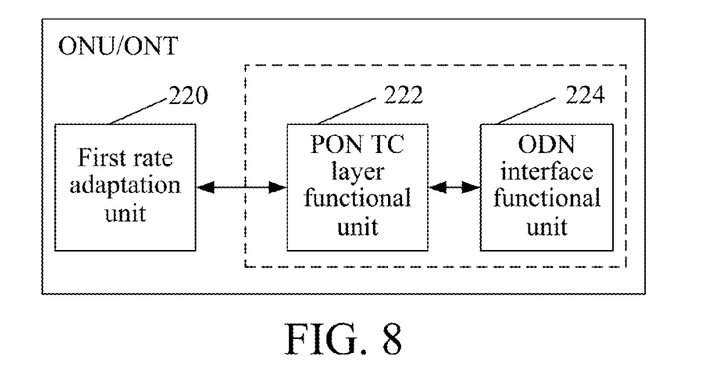
FIG. 8 is a schematic structural view of a specific embodiment of an ONU/ONT in a GPON in the present invention.

In a GPON network, a specific structure of the ONU/ONT in FIG. 7 is shown in FIG. 8. A first rate adaptation unit 220 adapts a rate of wireless service data from the RRU 1 to a GPON transmission rate, and performs conversion between frame formats. The specific function thereof is described as follows.

For TDM over GEM, the first rate adaptation unit 220 needs to adapt the wireless service data rate to the GPON transmission rate. A conversion circuit of a data sampling rate, a clock domain transform circuit having a first in first out (FIFO) structure, or a sampling transform filter may be used to implement rate conversion between a PON transmission rate TDM2 and a sampling rate TDM1 of an IF or RF interface of the RRU 1. Meanwhile, the first rate adaptation unit 220 may further need to perform conversion between a TDM2 frame format of the PON transmission and a TDM1 frame format used by the RRU 1.

For synchronous digital hierarchy (SDH) over GEM, the first rate adaptation unit 220 needs to adapt the wireless service data rate to the GPON transmission rate (the specific implementation is the same as described above), and further needs to perform conversion between an SDH frame format and a TDM1 frame format used by the RRU 1, for example, when the RRU 1 uses a CPRI frame format.

For Ethernet over GEM, the first rate adaptation unit 220 needs to adapt the wireless service data rate to the GPON transmission rate (the specific implementation is the same as described above), and further needs to perform encapsulation and decapsulation of TDM over Ethernet. The TDM over Ethernet may use two technologies: circuit emulation service over packet switch network (CES over PSN) and pseudowire edge to edge emulation (PWE3).

For Internet Protocol (IP) over GEM, the first rate adaptation unit 220 needs to adapt the wireless service data rate to the GPON transmission rate (the specific implementation is the same as described above), and further needs to perform encapsulation and decapsulation of TDM over IP.

Meanwhile, a first data processing unit of the ONU/ONT shown in FIG. 8 includes a PON transmission convergence (TC) layer functional unit 222 and a GPON ODN interface functional unit (for example, an ODN interface functional unit 224 shown in the figure). The PON TC layer functional unit 222 implements the function of a GPON TC layer in a GPON protocol stack, and performs data format conversion between the first adaptation signal and the fiber transmission signal. The ODN interface functional unit 224 implements the function of a physical layer in the GPON protocol stack, that is, the function of a GPM layer.

Figure 9:
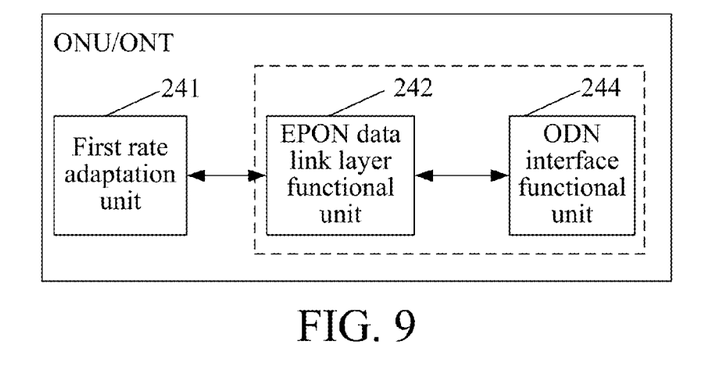
FIG. 9 is a schematic structural view of a specific embodiment of an ONU/ONT in an EPON in the present invention.

In an EPON network, a specific structure of the ONU/ONT 2 in FIG. 7 is shown in FIG. 9. A first rate adaptation unit 241 not only needs to adapt the wireless service data rate of the RRU 1 to the PON transmission rate (the specific implementation thereof is the same as described in the first rate adaptation unit 220), but also needs to perform encapsulation and decapsulation of TDM over Ethernet. The TDM over Ethernet may use two technologies: CES over PSN and PWE3.

Meanwhile, a first data processing unit of the ONU/ONT shown in FIG. 9 includes an EPON data link layer functional unit 242 and an EPON ODN interface functional unit (for example, an ODN interface functional unit 244 shown in the figure). The EPON data link layer functional unit 242 is configured to implement the function of a data link layer in an EPON protocol stack, and perform data format conversion between the first adaptation signal and the fiber transmission signal. The ODN interface functional unit 244 is configured to implement the function of a physical layer in the EPON protocol stack.

Figure 10:
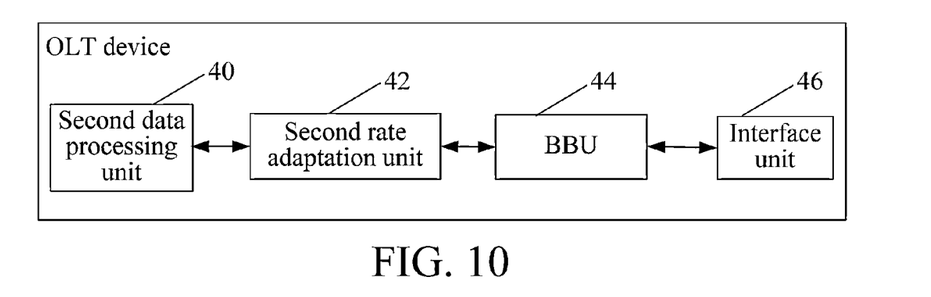
FIG. 10 is a schematic structural view of a specific embodiment of an OLT device shown in FIG. 6.

In the embodiment of the present invention, a specific structure of the OLT device is shown in FIG. 10. The OLT device includes a second data processing unit 40, a second rate adaptation unit 42, a BBU 44, and an interface unit 46. When a signal is transmitted from the user side to the network side, the second data processing unit 40 is configured to receive a fiber transmission signal from the ODN 3, convert the fiber transmission signal into a second adaptation signal according to an optical transmission protocol, and then send the second adaptation signal to the second rate adaptation unit 42; then, the second rate adaptation unit 42 performs rate adaptation and frame format conversion on the second adaptation signal to obtain a second IF/RF signal, and sends the second IF/RF signal to the BBU 44; and next, the BBU 44 converts the second IF/RF signal into a base band signal, and sends the base band signal to the interface unit 46; and then, the interface unit 46 converts the base band signal into a signal of another standard protocol.

When a signal is transmitted from the network side to the user side, the interface unit 46 is configured to receive a signal of another standard protocol, convert the signal of another standard protocol into a base band signal, and send the base band signal to the BBU 44; the BBU 44 converts the base band signal into a second IF/RF signal, and sends the second IF/RF signal to the second rate adaptation unit 42; the second rate adaptation unit 42 performs rate adaptation and frame format conversion on the second IF/RF signal to obtain a second adaptation signal, and sends the second adaptation signal to the second data processing unit 40; and the second data processing unit 40 converts the second adaptation signal into a fiber transmission signal according to an optical transmission protocol, and sends the fiber transmission signal to the ODN 3.

The interface unit 46 may specifically implement the function realized by an access node (AN), a broadband remote access server (BRAS), or a broadband network gateway (BNG) defined in the TR101 standard.

Figure 11:
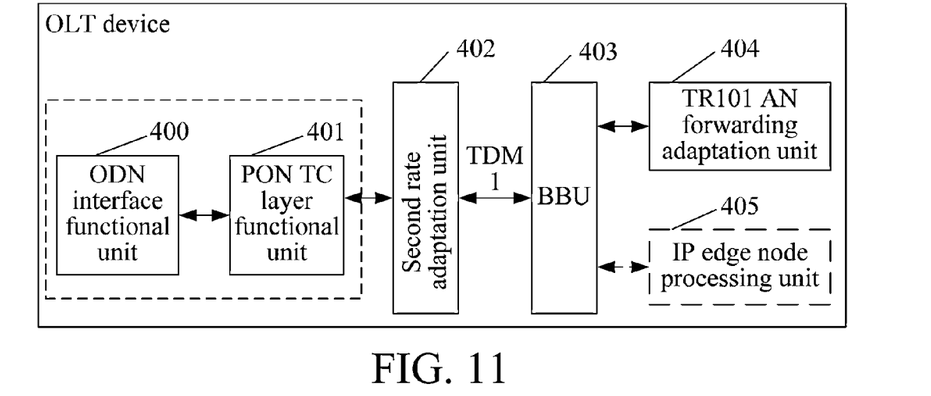
FIG. 11 is a schematic structural view of a specific embodiment of an OLT device in the GPON in the present invention.

In the GPON network, a specific structure of the OLT device in FIG. 10 may be shown in FIG. 11. The OLT device includes a second data processing unit (as shown in FIG. 11, the second data processing unit includes a GPON ODN interface functional unit such as an ODN interface functional unit 400 shown in the figure and a PON TC layer functional unit 401), a second rate adaptation unit 402, a BBU 403, and an interface unit. The interface unit in FIG. 11 may specifically be a TR101 AN forwarding adaptation unit 404 or an IP edge node processing unit 405.

The specific functions of the ODN interface functional unit 400 and the PON TC layer functional unit 401 are similar to the functions of the ODN interface functional unit 224 and the PON TC layer functional unit 222 in the ONU/ONT 22 in FIG. 8. The ODN interface functional unit 400 and the PON TC layer functional unit 401 are respectively configured to implement the relevant function of a GPM layer and the function of a GPON TC layer in the GPON protocol stack.

The second rate adaptation unit 402 implements adaptation and conversion between data of the RRU 1 and the PON transmission rate and frame formats, which also include the cases of TDM over GEM, SDH over GEM, Ethernet over GEM, and IP over GEM. The conversion between frame formats and the rate adaptation of the second rate adaptation unit 402 are similar to those described in the first rate adaptation unit 200 in FIG. 7.

The TR101 AN forwarding adaptation unit 404 or the IP edge node processing unit 405 corresponds to the interface unit 46 in FIG. 10, and is configured to implement the function realized by an AN, a BRAS, or a BNG defined in the TR101. The selection between the units depends on the network connected to the OLT device 40.

Figure 12:
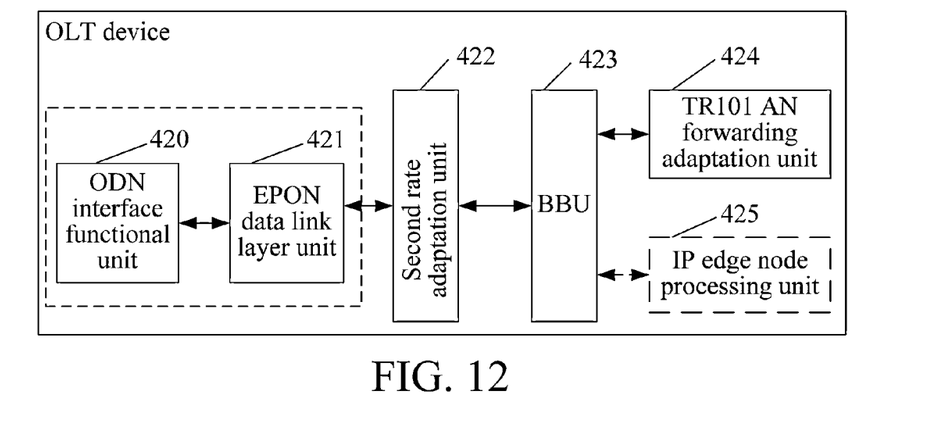
FIG. 12 is a schematic structural view of a specific embodiment of an OLT device in the EPON in the present invention.

In the EPON network, a specific structure of the OLT device in FIG. 10 is shown in FIG. 12. The OLT device includes a second data processing unit (as shown in FIG. 12, the second data processing unit includes an EPON ODN interface functional unit such as an ODN interface functional unit 420 shown in the figure and an EPON data link layer unit 421), a second rate adaptation unit 422, a BBU 423, and a TR101 AN forwarding adaptation unit 424 or an IP edge node processing unit 425.

The specific functions of the ODN interface functional unit 420 and the EPON data link layer unit 421 are similar to the functions of the ODN interface functional unit 244 and the EPON data link layer unit 242 in the ONU/ONT 24 in FIG. 9. The ODN interface functional unit 420 and the EPON data link layer unit 421 are respectively configured to implement the relevant function of a physical layer and the function of a data link layer in the EPON protocol stack.

The second rate adaptation unit 422 implements adaptation and conversion between data of the RRU 1 and the PON transmission rate and frame formats, and the conversion between frame formats and the rate adaptation thereof are similar to those described in the first rate adaptation unit 220 in FIG. 8.

The TR101 AN forwarding adaptation unit 424 or the IP edge node processing unit 425 is corresponding to the interface unit 46 in FIG. 10, and is configured to implement the function realized by an AN, BRAS, or BNG defined in the TR101 standard. The selection between the units depends on the network connected to the OLT device 42.

Figure 13:
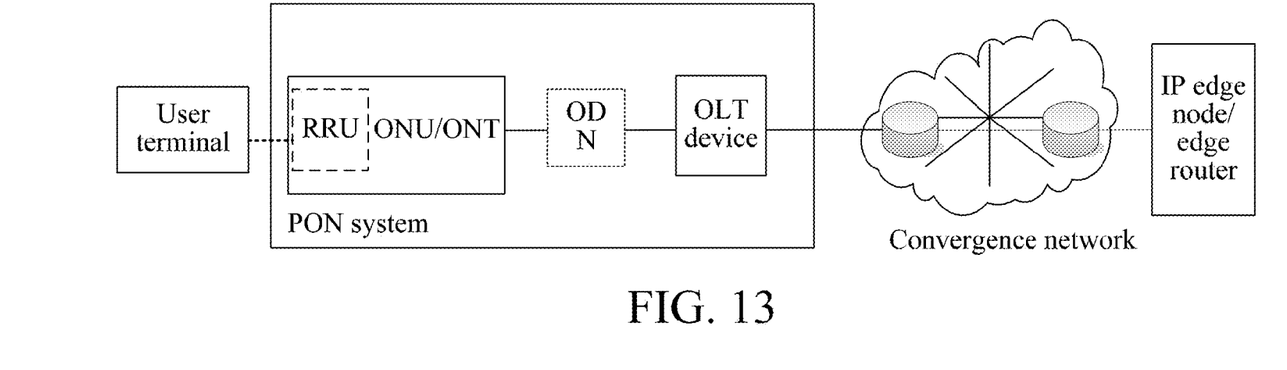
FIG. 13 is a schematic view of a second specific embodiment of an OAN system in the present invention.

FIG. 13 is a schematic view of a second specific embodiment of an OAN system in the present invention. As shown in the figure, the difference between this embodiment and the PON system shown in FIG. 6 lies in that, an RRU and an ONU/ONT may be integrated and installed in the same device, for example, the RRU is installed in the ONU/ONT in this embodiment. The structure and functions of other parts in the system are unchanged. Thus, the structure and functions of other parts in the system are not described here and only the function of the ONU/ONT is described.

Figure 14:
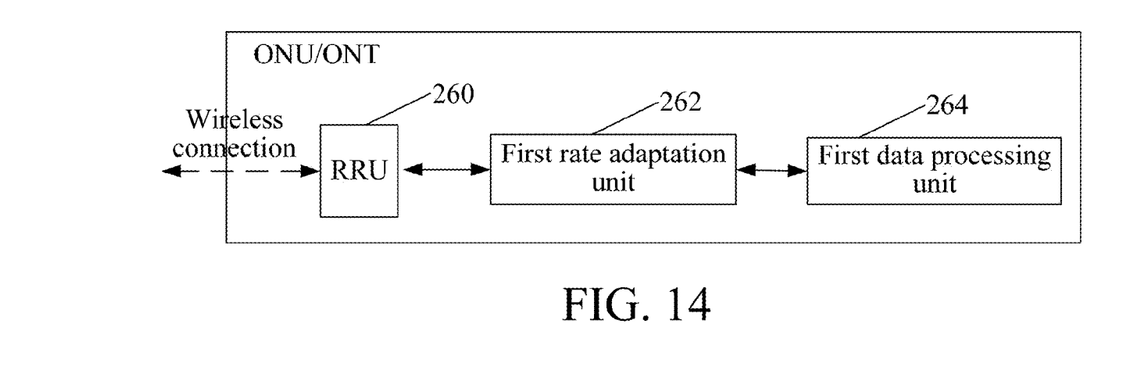
FIG. 14 is a schematic structural view of a specific embodiment of an ONU/ONT shown in FIG. 13.

FIG. 14 is a schematic structural view of the ONU/ONT shown in FIG. 13. The ONU/ONT includes an RRU 260, a first rate adaptation unit 262, and a first data processing unit 264. The specific function of the RRU 260 is identical with the function of the RRU 1 in FIG. 6. The specific functions of the first rate adaptation unit 262 and the first data processing unit 264 as well as their specific structures in the GPON and EPON are respectively identical with those of the first rate adaptation unit 200 and the first data processing unit 202 in FIG. 7.

In the OAN system shown in FIG. 6 and FIG. 13, the function of the OLT device for performing conversion between a second IF/RF signal and a base band signal may also be realized by using a BBU independent of the OLT device shown in FIG. 1, and the interface unit in the OLT device implements the function of interfacing with the subsequent BBU or another network. The independent BBU may be subsequent to an OLT device that does not have the function of conversion between the second IF/RF signal and the base band signal, and is not described here.

Figure 15:
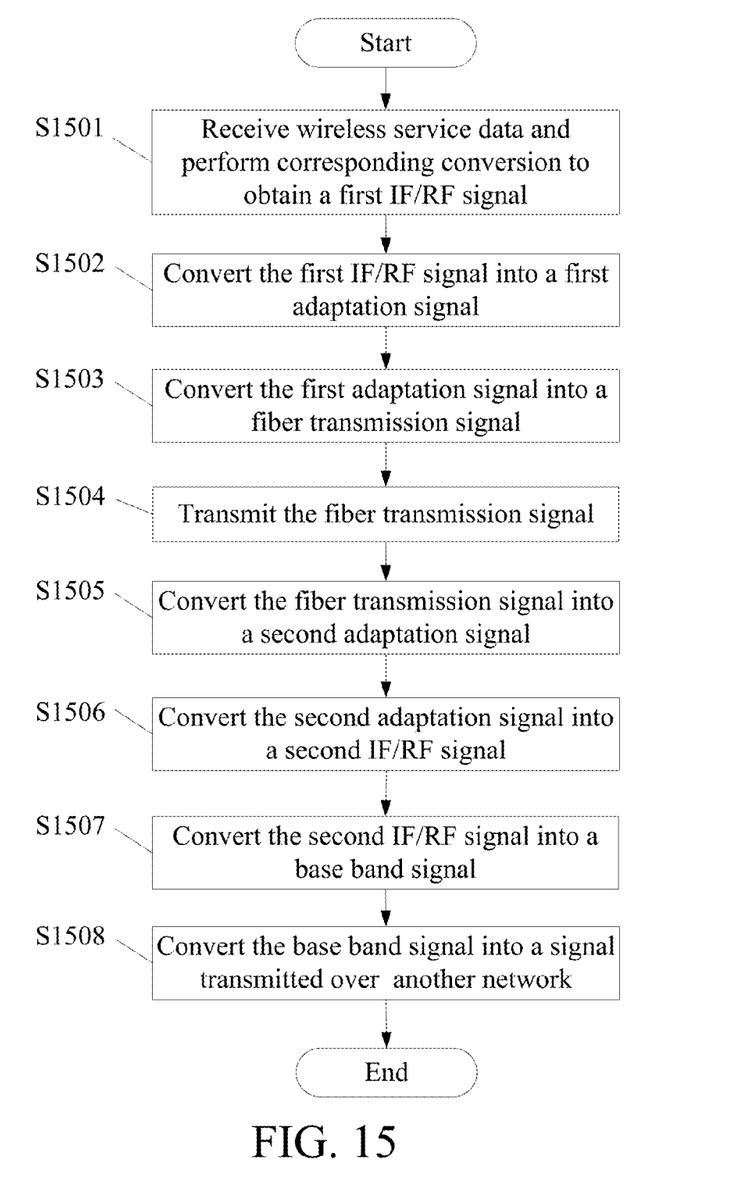
FIG. 15 is a schematic flow chart of a specific embodiment of a data transmission method of an OAN in the present invention.

A specific embodiment of a data transmission method of an OAN in the present invention is described in detail below. Referring to FIG. 15, the specific embodiment of this method describes the case in which a signal is transmitted from the user side to the network side. The method specifically includes the following steps.

In step S1501, wireless service data of a wireless user is received, and IF and/or RF processing is performed on the wireless service data to obtain a first IF/RF signal.

In step S1502, rate adaptation and frame format conversion are performed on the first IF/RF signal to obtain a first adaptation signal. According to different specific implementation networks, the first IF/RF signal may be in a TDM1 format, and the first adaptation signal may be in a TDM2, SDH, ETH, or other formats; then, rate adaptation and frame format conversion from TDM1 to TDM2, SDH, ETH, or other formats needs to be performed. The implementation and application thereof may be referred to the implementation and application of the specific function of the first rate adaptation unit 200 described in FIG. 7, and thus are not described here.

In step S1503, the first adaptation signal is converted into a fiber transmission signal according to an optical transmission protocol. The implementation and application thereof may be referred to the implementation and application of the specific function of the first data processing unit 202 described in FIG. 7, and thus are not described here.

In step S1504, the fiber transmission signal is transmitted over an ODN.

In step S1505, the fiber transmission signal transmitted over the ODN is converted into a second adaptation signal according to the optical transmission protocol. The implementation and application thereof may be referred to the implementation and application of the specific function of the second data processing unit 40 described in FIG. 10, and thus are not described here.

In step S1506, rate adaptation and frame format conversion are preformed on the second adaptation signal to obtain a second IF/RF signal. The implementation and application thereof may be referred to the implementation and application of the specific function of the second rate adaptation unit 42 described in FIG. 10, and thus are not described here.

In step S1507, base band signal processing and/or data processing of a wireless data link layer and upper layers thereof is performed on the second IF/RF signal to obtain a base band signal.

In step S1508, the base band signal is converted into a signal of another standard protocol for transmission to another network.

In another specific embodiment of a data transmission method of an OAN in the present invention, the case in which a signal is transmitted from the network side to the user side is described. The method may specifically include the following steps.

a. A signal of another standard protocol from another network is received, and is converted into a base band signal.

b. Base band signal processing and/or data processing of a wireless data link layer and upper layers thereof is performed on the base band signal to obtain a second IF/RF signal.

c. Rate adaptation and frame format conversion are preformed on the second IF/RF signal to obtain a second adaptation signal. The implementation and application thereof may be referred to the implementation and application of the specific function of the second rate adaptation unit 42 described in FIG. 10, and thus are not described here.

d. Then, the second adaptation signal is converted into a fiber transmission signal according to an optical transmission protocol. The implementation and application thereof may be referred to the implementation and application of the specific function of the second data processing unit 40 described in FIG. 10, and thus are not described here.

e. The fiber transmission signal is transmitted through an ODN.

f. The fiber transmission signal transmitted through the ODN is converted into a first adaptation signal according to the optical transmission protocol. The implementation and application thereof may be referred to the implementation and application of the first data processing unit 202 described in FIG. 7, thus are not described here.

g. Rate adaptation and frame format conversion are preformed on the first adaptation signal to obtain a first IF/RF signal. The implementation and application thereof may be referred to the implementation and application of the specific function of the first rate adaptation unit 200 described in FIG. 7, and thus are not described here.

h. The first IF/RF signal is converted to obtain wireless service data that can be sent to a wireless user, and the wireless service data is sent to the wireless user.

As described above, the existing OAN system (for example, a GPON and an EPON) has established a series of industrial standards, and devices produced by different manufacturers can match each other. In this way, the problem of unmatchable devices produced by different manufacturers between an RRU and a BBU is solved by connecting the RRU and the BBU with standardized interfaces in the OAN through a combination of a distributed base station with the OAN system, that is, a combination of the RRU and the BBU with corresponding devices in the OAN. The large-scale application of the OAN in the distributed base station may promote the rapid industrialization of the distributed base station and effectively reduce the network construction cost of a cellular system.

The above disclosure is merely exemplary embodiments of the present invention, but certainly is not intended to limit the scope of the present invention. Any equivalent variation made according to the claims of the present invention shall fall within the scope of the present invention.

What is claimed is:

1. An optical access network (OAN) system, comprising:
a remote radio unit (RRU);
an optical network device;
an optical distribution network (ODN);
an optical line terminal (OLT) device, wherein;
the RRU is configured to receive a wireless service data, convert the wireless service data into a first frequency signal, and send the first frequency signal to the optical network device;
the optical network device is configured to receive the first frequency signal from the RRU, convert the first frequency signal into a fiber transmission signal, and send the fiber transmission signal to the ODN;
the ODN is configured to transmit the fiber transmission signal sent by the optical network device to the OLT device; and
the OLT device is configured to receive the fiber transmission signal transmitted by the ODN, and convert the fiber transmission signal into a signal of another standard protocol which is sent to an IP edge node through a convergence network;
wherein the optical network device comprises an optical network unit (ONU) and is specifically configured to:
receive the first frequency signal from the RRU, adapt a rate of the wireless service data from the RRU to a GPON transmission rate, perform frame format conversion on the first frequency signal to obtain a first adaptation signal, and convert the first adaptation signal into the fiber transmission signal according to an optical transmission protocol.

2. The system according to claim 1, wherein:
the OLT device is further configured to convert a signal of another standard protocol sent from an IP edge node through a convergence network, into a fiber transmission signal, and send the fiber transmission signal to the ODN for transmission;
the ODN is further configured to transmit the fiber transmission signal to the optical network device;
the optical network device is further configured to receive the fiber transmission signal transmitted by the ODN, convert the fiber transmission signal into a first frequency signal, and send the first frequency signal to the RRU; and
the RRU is further configured to convert the first frequency signal into a wireless signal, and send the wireless signal.

3. The system according to claim 1, wherein the RRU and the optical network device are integrated and installed in a same device.

4. The system according to claim 1, wherein the OLT device comprises a second data processing unit, a second rate adaptation unit, a base band unit (BBU), and an interface unit,
the second data processing unit is configured to receive the fiber transmission signal from the ODN, convert the fiber transmission signal into a second adaptation signal according to an optical transmission protocol, and send the second adaptation signal to the second rate adaptation unit;
the second rate adaptation unit is configured to receive the second adaptation signal from the second data processing unit, perform rate adaptation and frame format conversion on the second adaptation signal to obtain a second frequency signal, and send the second frequency signal to the BBU;
the BBU is configured to receive the second frequency signal sent by the second rate adaptation unit, convert the second frequency signal into a base band signal, and send the base band signal to the interface unit; and
the interface unit is configured to receive the base band signal sent by the BBU, and convert the base band signal into a signal of another standard protocol.

5. An optical line terminal (OLT) device, comprising:
a data processing unit;
a rate adaptation unit;
a base band unit (BBU);
an interface unit, wherein;
the data processing unit is configured to receive a fiber transmission signal from an optical distribution network (ODN), convert the fiber transmission signal into a adaptation signal according to an optical transmission protocol, and send the adaptation signal to the rate adaptation unit;
the rate adaptation unit is configured to receive the adaptation signal from the data processing unit, perform rate adaptation and frame format conversion on the adaptation signal to obtain a frequency signal, and send the frequency signal to the BBU;
the BBU is configured to receive the frequency signal sent by the rate adaptation unit, convert the frequency signal into a base band signal, and send the base band signal to the interface unit; and
the interface unit is configured to receive the base band signal sent by the BBU, and convert the base band signal into a signal of another standard protocol which is sent to an IP edge node through a convergence network.

6. The OLT device according to claim 5, wherein:
the interface unit is further configured to receive a signal of another standard protocol, convert the signal of another standard protocol into a base band signal, and send the base band signal to the BBU;
the BBU is further configured to receive the base band signal sent by the interface unit, convert the base band signal into a frequency signal, and send the frequency signal to the rate adaptation unit;
the rate adaptation unit is further configured to receive the frequency signal sent by the BBU, perform rate adaptation and frame format conversion on the frequency signal to obtain a adaptation signal, and send the adaptation signal to the data processing unit; and
the data processing unit is configured to receive the adaptation signal sent by the rate adaptation unit, convert the adaptation signal into a fiber transmission signal according to an optical transmission protocol, and send the fiber transmission signal to an ODN for transmission.

7. The OLT device according to claim 5, wherein when the OLT device is used in a Gigabit passive optical network (GPON), the data processing unit comprises:
a GPON ODN interface functional unit, configured to implement a function of a physical layer in a GPON protocol stack; and
a PON transmission convergence (TC) layer functional unit, configured to implement a function of a TC layer in the GPON protocol stack, and perform data format conversion between the adaptation signal and the fiber transmission signal.

8. The OLT device according to claim 5, wherein when the OLT device is used in an Ethernet passive optical network (EPON), the data processing unit comprises:
an EPON ODN interface functional unit, configured to implement a function of a physical layer in an EPON protocol stack; and
an EPON data link layer functional unit, configured to implement a function of a data link layer in the EPON protocol stack, and perform data format conversion between the adaptation signal and the fiber transmission signal.

9. A data transmission method of an optical access network (OAN), comprising:
receiving, by a remote radio unit (RRU), wireless service data of a wireless user, and performing frequency processing on the wireless service data to obtain a first frequency signal, and sending the first frequency signal to an optical network unit (ONU);
adapting, by the ONU, a rate of the wireless service data from the RRU to a GPON transmission rate, performing frame format conversion on the first frequency signal to obtain a first adaptation signal; converting the first adaptation signal into a fiber transmission signal according to an optical transmission protocol, and transmitting the fiber transmission signal over an optical distribution network (ODN); and
converting, by an optical line terminal (OLT) device, the fiber transmission signal transmitted through the ODN into a signal of another standard protocol which is sent to an IP edge node through a convergence network.

10. The method according to claim 9, wherein the converting the fiber transmission signal transmitted over the ODN into the signal of another standard protocol comprises:
converting the fiber transmission signal transmitted over the ODN into a second adaptation signal according to the optical transmission protocol;

performing rate adaptation and frame format conversion on the second adaptation signal to obtain a second frequency signal;

performing base band signal processing and/or data processing of a wireless data link layer and upper layers thereof on the second frequency signal to obtain a base band signal; and converting the base band signal into a signal of another standard protocol for transmission to another network.

* * * * *